(12) United States Patent
Hoff et al.

(10) Patent No.: US 8,484,997 B2
(45) Date of Patent: Jul. 16, 2013

(54) METHOD FOR PRODUCING A CYLINDER OF QUARTZ GLASS USING A HOLDING DEVICE AND APPROPRIATE HOLDING DEVICE FOR PERFORMING THE METHOD

(75) Inventors: Frank Hoff, Greppin (DE); Michael Muschler, Rosslau (DE); Udo Peper, Halle (DE); Sven Schmidt, Zorbig (DE); Steffen Zwarg, Wolfen (DE); Hans-Georg Fritsche, Bobbau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 644 days.

(21) Appl. No.: 12/452,323

(22) PCT Filed: Jun. 5, 2008

(86) PCT No.: PCT/EP2008/056976
§ 371 (c)(1),
(2), (4) Date: Jan. 26, 2010

(87) PCT Pub. No.: WO2009/000621
PCT Pub. Date: Dec. 31, 2008

(65) Prior Publication Data
US 2010/0126217 A1 May 27, 2010

(30) Foreign Application Priority Data

Jun. 25, 2007 (DE) .......................... 10 2007 029 506

(51) Int. Cl.
*C03B 37/012* (2006.01)
(52) U.S. Cl.
USPC .......................................................... 65/427
(58) Field of Classification Search
USPC .................................................. 65/416, 427
See application file for complete search history.

(56) References Cited

U.S. PATENT DOCUMENTS

| 4,157,906 A | 6/1979 | Bailey |
| 4,362,545 A | 12/1982 | Bailey et al. |

(Continued)

FOREIGN PATENT DOCUMENTS

| DE | 103 03 290 B3 | 5/2004 |
| EP | 701 975 A2 | 3/1996 |

(Continued)

OTHER PUBLICATIONS espacenet English language abstract for DE 103 03 290 B3 published May 6, 2004.
espacenet English language abstract for JP 11 199 261 A published Jul. 27, 1999.
espacenet English language abstract for JP 2005298287 A published Oct. 27, 2005.

*Primary Examiner* — Joseph S Del Sole
*Assistant Examiner* — Erin Snelting
(74) *Attorney, Agent, or Firm* — Tiajoloff and Kelly LLP

(57) ABSTRACT

A known method for producing a cylinder of quartz glass comprises a method step in which a porous $SiO_2$ body comprising a central inner bore, a lower end and an upper end is sintered in a sintering furnace zone by zone, starting from the upper end, to obtain the quartz glass cylinder, a holding device being used by means of which the $SiO_2$ body is held standing in vertical orientation during a first sintering phase and suspended in a second sintering phase. Starting therefrom, to indicate a method by means of which even heavy bodies of porous $SiO_2$ can be reliably held during sintering, it is suggested according to the invention that the holding device comprises a fusion body of quartz glass which is arranged in the area of the upper end in the inner bore and which in the course of the first sintering phase fuses with the quartz glass of the $SiO_2$ body and which during the second sintering phase is in operative interaction with a holding element of the holding device and together with said element contributes to a suspended holding of the $SiO_2$ body to be sintered.

5 Claims, 3 Drawing Sheets

U.S. PATENT DOCUMENTS

Figure 1:
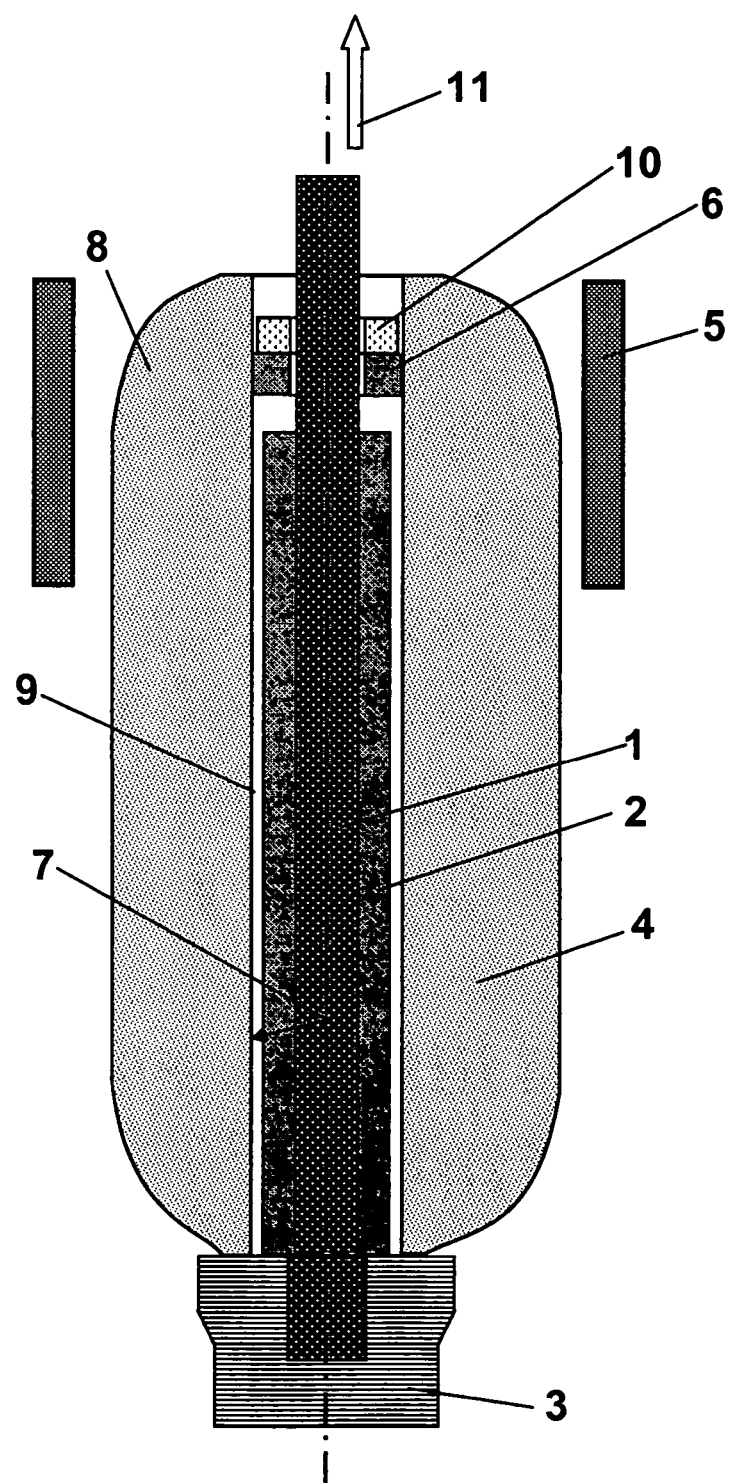

| | | | |
|---|---|---|---|
| 5,665,132 A * | 9/1997 | Ruppert et al. | 65/17.1 |
| 5,788,734 A | 8/1998 | Hoshino et al. | |
| 6,422,042 B1 | 7/2002 | Berkey | |
| 2004/0065121 A1* | 4/2004 | Kotulla et al. | 65/421 |
| 2006/0144094 A1 | 7/2006 | Roselieb et al. | |

FOREIGN PATENT DOCUMENTS

| | | |
|---|---|---|
| EP | 1 044 931 A | 10/2000 |
| JP | 11 199 261 A | 7/1999 |
| JP | 2005298287 A | 10/2005 |

* cited by examiner

METHOD FOR PRODUCING A CYLINDER OF QUARTZ GLASS USING A HOLDING DEVICE AND APPROPRIATE HOLDING DEVICE FOR PERFORMING THE METHOD

The present invention relates to a method for producing a cylinder of quartz glass, comprising a method step in which a porous $SiO_2$ body comprising a central inner bore, a lower end and an upper end is sintered in a sintering furnace zone by zone, starting from the upper end, to obtain the quartz glass cylinder, a holding device being used by means of which the $SiO_2$ body is held standing in vertical orientation during a first sintering phase and suspended in a second sintering phase.

Furthermore, the present invention relates to a holding device for performing the method for producing a cylinder of quartz glass by sintering a tubular porous $SiO_2$ body, the device comprising a support base and a holding rod which is connected to the support base and extends through the inner bore of the $SiO_2$ body to be sintered.

PRIOR ART

Hollow cylinders or tubes of synthetic quartz glass are used as intermediate products for a multitude of components for the optical and chemical industry and particularly for making preforms for optical fibers and are used for further processing into lens blanks for microlithography.

The so-called "soot method" comprises the production of the intermediate product of a deposition process of $SiO_2$, wherein a porous blank is formed from $SiO_2$ particles (here called "soot body" or "soot tube"), which is subsequently sintered into a quartz glass cylinder. The sintering of a soot tube (also called "vitrification") may be carried out such that the inner bore of the soot tube is completely collapsing at the same time, resulting in a solid cylinder.

The sintering of a soot tube is e.g. described in U.S. Pat. No. 4,157,906 A. Disclosed are a method and a device, wherein an $SiO_2$ soot tube is sintered in a method step, the inner bore is collapsed in this process and simultaneously elongated to obtain a fiber. For holding the $SiO_2$ soot tube in a drawing and vitrifying furnace in vertical orientation a tube section of quartz glass with a length of about 50 mm is inserted into the inner bore of the soot tube, the outer diameter of the tube section approximately corresponding to the inner diameter of the inner bore, and the end intended for insertion into the inner bore comprising hump-like thickened portions. To anchor the quartz glass tube, the hump-like thickened portions are twisted in the inner bore by about 90°, resulting in the establishment of a positive connection resembling a bayonet lock. The soot tube is held suspended on its upper end from the turned-in holder and is supplied, starting with its lower end, to a heating zone and is softened therein zone by zone and elongated into a fiber.

While the tube section is turned into the wall of the soot tube, particles are generated that deposit on the inner wall of the soot tube and may be noticed in a disadvantageous way in the further process. Moreover, break-outs and cracks may occur that will make the soot tube unusable or may later lead to a breaking away of the holder.

It has also been suggested that a holder of quartz glass should be incorporated into the evolving soot body already in the deposition process, so that it projects on the face out of the soot body to be sintered and can thus be used for a suspended holding of the soot body in subsequent process steps. Such a method is for example known from U.S. Pat. No. 4,362,545 A.

The embedment of the holder, however, is difficult to reproduce and the strength can hardly be checked. Attention must here be paid that for enhancing the productivity increasingly larger quartz glass cylinders are demanded, so that the weights of the soot tubes to be sintered are also increasing continuously. It is difficult to hold heavy soot tubes in the above-described procedures.

EP 701 975 A2 discloses a method and a device of the above-mentioned type. The soot tube is here introduced into a vitrification furnace and is held therein in vertical orientation by means of a holding device. Said device comprises a holding rod which extends from above through the inner bore of the soot tube and which is connected to a holding base on which at the beginning the soot tube is standing with its lower end. The holding rod consists of carbon fiber-reinforced graphite (CFC; carbon fiber-reinforced carbon), and it is closely surrounded or clad by a gas-permeable thin-walled cladding tube of pure graphite. In a position above the upper end of the cladding tube a graphite support ring is embedded into the inner bore, the graphite support ring projecting inwardly.

In a modification of this method according to DE 103 03 290 B3 an additional feature is provided, according to which a casing or cladding of synthetic quartz glass is positioned between the holding rod and the soot tube during sintering.

During sintering the soot tube is vitrified zone by zone, starting with its upper end. The soot tube is here successively collapsing onto the cladding tube of graphite, while shrinking in its length, and is standing on the holding base in a first sintering phase. The position of the graphite support ring embedded in the soot tube is chosen such that it is supported in a second sintering phase due to the increasing longitudinal shrinkage on the cladding tube of graphite, so that the soot tube is then held suspended at the upper end.

The support surface provided by the graphite support ring is however limited in its size due to procedural technical reasons such that at high loads the soot tube may slip off in the second sintering phase.

During sintering the soot tube collapses onto the cladding tube of graphite. Impurities found in the graphite, particularly metallic impurities, may here dissolve and get introduced into the quartz glass of the soot tube. Due to contact with the cladding tube the hollow cylinder produced in this way additionally comprises a rough inner surface with baked-in graphite particles. After sintering the cladding tube is removed, and the inner bore of the resulting quartz glass tube is reworked by drilling, grinding, honing or etching. This method is therefore time-consuming and leads to losses of material.

Similar problems are also posed during sintering of other bodies consisting of porous $SiO_2$, which have not been produced via the $SiO_2$ soot method route, for instance in the case of porous $SiO_2$ bodies which have been obtained through the known sol-gel route or via a pressing method.

TECHNICAL OBJECT

It is the object of the present invention to indicate a method for producing a cylinder of quartz glass, by means of which even heavy bodies of porous $SiO_2$ can be reliably held during sintering.

It is also the object of the present invention to provide a constructionally simple and operationally reliable holding device for performing the method.

As for the method, this object, starting from the above-mentioned method, is achieved according to the invention in that the holding device comprises a fusion body of quartz glass which is arranged in the area of the upper end in the inner bore and which in the course of the first sintering phase fuses with the quartz glass of the $SiO_2$ body and which during the second sintering phase is in operative interaction with a holding element of the holding device and together with said element contributes to the suspended holding of the $SiO_2$ body to be sintered.

An important aspect of the invention must be seen in the feature that the holding device comprises a fusion body of quartz glass which in the first sintering phase, during which the upper end of the $SiO_2$ body is sintered and the $SiO_2$ body is held standing on its lower face, is fused into the sintering $SiO_2$ body, namely in the area of the upper end thereof. After cooling and consolidation of the sintered upper $SiO_2$ body end, the fusion body is inseparably fused or molten at least in part with the sintered quartz glass of the $SiO_2$ body and is normally embedded therein also in a form-fit or positive way. In the fusion area the fusion body will normally lose its original shape unless special measures are taken for preventing such a condition, e.g. by using a quartz glass component that is made of quartz glass exhibiting a viscosity higher than that of the $SiO_2$ body quartz glass.

A further aspect of the invention is that the fusion body fused (molten and/or embedded) in this way contributes to the suspended holding of the $SiO_2$ body in the course of the further sintering process. For this purpose the fused fusion body is connected either to a further holding element of the holding device, such as a gripper or a holding rod, or it will get in the course of the sintering process into direct or indirect operative interaction with a further holding element, for instance due to a progressive longitudinal shrinking during sintering of the $SiO_2$ body.

The contribution of the fused fusion body to the suspended holding of the $SiO_2$ body may also be such that it mechanically reinforces another holding element for the suspended holding or stabilizes such an element in its position.

Since the $SiO_2$ body during the first sintering phase is supported in a standing position, a mechanical positive connection between $SiO_2$ body and quartz glass component is not needed in this procedural stage yet. The measures known from the prior art for fixing a holding member in an $SiO_2$ body prior to the beginning of the sintering process, such as embedding or turning in, can therefore be avoided and thus also the accompanying drawbacks and risks.

The former fusion body, however, is firmly inserted into the consolidated quartz glass mass after consolidation of the sintered upper end of the $SiO_2$ body and can therefore be used in the second sintering phase for a stable and operationally reliable suspended holding of the $SiO_2$ body section to be still sintered.

Since the fusion body contributing to a suspended holding of the $SiO_2$ body consists of quartz glass, preferably of synthetic quartz glass, and thus of a similar material with respect to the material of the $SiO_2$ body, the risk of contamination of the $SiO_2$ body by the fusion body is small during sintering.

In the sintering process the $SiO_2$ body is supplied, starting with the upper end, to a heating zone shorter than the length of the $SiO_2$ body, and is heated and softened therein zone by zone. The inner bore of the $SiO_2$ body collapses in part or completely during sintering.

Several preferred variants of the method of the invention shall now be explained in more detail hereinafter.

In a first preferred variant, a holding device is used, in which in the area of the upper end of the inner bore of the $SiO_2$ body a support ring is recessed into the $SiO_2$ body wall on which the fusion body is positioned at the beginning of the first sintering phase, the support ring being supported due to longitudinal shrinkage of the $SiO_2$ body in the second sintering phase on a bearing arranged in the inner bore.

The use of a holding device with such a support ring is known from the above-mentioned EP 701 975 A2. The support ring may e.g. be made from graphite. As a rule, it is fixed at the beginning of the first sintering phase some distance above a counter-bearing in the inner bore of the $SiO_2$ body, with which it comes into contact in the course of the first sintering phase due to the longitudinal shrinkage of the $SiO_2$ body, the support ring coming to rest with its bottom side on the counter-bearing and thereafter contributing to a suspended holding of the $SiO_2$ body to be sintered.

The modification of this prior art according to the present invention is based on the measure to mechanically reinforce the support ring and to stabilize it in its position before it has to assume its supporting function during the second sintering phase. These reinforcing and stabilizing measures are carried out during the first sintering phase in which a fusion body resting on the support ring directly or indirectly is heated, softened in this process and establishes a connection with the sintering quartz glass of the $SiO_2$ body and simultaneously flows around the support ring, thereby fixing it in its position. As a consequence, the support ring can no longer escape laterally and a slipping off from the counter-bearing is thereby prevented. As a consequence, even heavy $SiO_2$ bodies can be held reliably in suspended fashion by means of support rings having small supporting or holding surfaces.

In the simplest case the fusion body is ring-shaped.

The support ring is here covered over its circumference with the quartz glass of the fusion body. The fusion body is configured as a ring or sleeve, wherein the thickness of the wall of the ring or the sleeve may here approximately correspond to the width of the annular support or holding surface, as is provided by the support ring.

In this connection it has turned out to be advantageous when the holding device comprises a support base, a holding rod connected to the support base, and a cladding tube partly surrounding the holding rod, the holding rod extending through the inner bore of the $SiO_2$ body, and the fusion body being configured in the form of a quartz glass sleeve having a wall thickness configured such that it fills the annular gap between holding rod and $SiO_2$ body inner wall so that a residual annular gap with a width of less than 2 mm remains relative to the holding rod.

The fusion body is here configured in the form of a quartz glass sleeve that extends over a certain height along the holding rod. It assumes additional functions by protecting the holding rod against mechanical action and damage and by shielding it to some extent from an oxidative environment.

In an alternative and equally preferred variant of the method the holding device is used without the above-described support ring. The holding device comprises' here a support base, a holding rod connected to the support base, and a cladding tube partly surrounding the holding rod, the holding rod extending through the inner bore of the $SiO_2$ body, and the fusion body being configured like a ring and positioned on the upper face of the cladding tube.

The cladding tube may e.g. consist of high-purity graphite, as described in the above-mentioned EP 701 975 A2. The cladding tube of graphite may here be surrounded by a quartz glass tube. It is important that a quartz-glass fusion body within the meaning of the invention rests on the upper face of the cladding tube directly or indirectly. The upper and lower end of the $SiO_2$ body is rejected during further processing. Therefore the cladding tube need not extend over the whole inner bore of the $SiO_2$ body. The cladding tube ends shortly before the upper end of the $SiO_2$ body.

While the upper end of the SiO$_2$ body is being sintered (first sintering phase), the fusion body is fused with the inner wall of said body, thereby forming a constriction of the inner bore after consolidation. As long as the quartz glass mass of the fusion body has not consolidated completely, the upper face of the cladding tube can penetrate from below into the soft quartz glass mass. This penetrating movement is stopped after the mass has consolidated, so that the constriction is thereafter supported on the upper edge of the cladding tube, whereby the further longitudinal shrinkage of the SiO$_2$ body leads to a gradual lifting from the stand base and to the suspended holding of the soot tube.

In this variant of the method the fusion body is also preferably configured in the form of a quartz glass sleeve having a wall thickness configured such that it fills the annular gap between holding rod and SiO$_2$ body inner wall such that a residual annular gap with a width of less than 2 mm remains relative to the holding rod.

The sleeve-shaped fusion body extends over a certain height along the holding rod, thereby assuming additional functions during the first sintering phase in that the quartz glass sleeve protects the holding rod against mechanical action and damage and shields it to some extent against an oxidative environment, as has been described above with reference to the first variant of the method.

According to a further preferred variant of the method, the fusion body is configured as an elongated quartz glass body which comprises an upper end and a lower end, the lower end projecting into the inner bore of the SiO$_2$ body, and the upper end being gripped by a holder by means of which the SiO$_2$ body to be sintered is held suspended from the quartz glass body during the second sintering phase.

The elongated fusion body is e.g. configured as a solid cylinder, a hollow cylinder or a cone; it may also have a profiled outer jacket. What is important is that it extends partly into the inner bore of the SiO$_2$ body and protrudes with its upper end. One essential advantage of this method variant is also that the form closure between the fusion body and the SiO$_2$ body itself need not be produced in advance, but is so to speak automatically obtained during the first sintering phase by fusion of the upper area of the SiO$_2$ body. This just requires that the fusion body projects into the upper area of the inner bore with its lower end in the first sintering phase and gets into contact with the inner wall of the SiO$_2$ body during collapsing of the inner bore.

In the course of the first sintering phase a melt connection or bond is established between fusion body and inner wall of the SiO$_2$ body, which bond can assume a supporting function after consolidation. A holder from which the SiO$_2$ body to be sintered is suspended during the second sintering phase can thus act on the end of the fusion body projecting upwards out of the inner bore.

For reasons of convenience the quartz glass of the fusion body is normally of a quartz glass quality that at the sintering temperature has the same or a similar viscosity as the quartz glass of the SiO$_2$ body. However, a variant of the method has also turned out to be advantageous, in which the fusion body is of a quartz glass quality that at the sintering temperature has a higher viscosity than the quartz glass of the SiO$_2$ body.

This is conducive to a certain dimensional stability of the elongated fusion body also after fusion during the first sintering phase and thus also to an exact vertical orientation of the suspended SiO$_2$ body. A higher viscosity is e.g. achieved by adding dopants such as Al$_2$O$_3$ or nitrogen or by way of a hydroxyl group content that is lower than that of the SiO$_2$ body.

Especially with respect to a high purity of the SiO$_2$ body to be sintered, a fusion body is used which consists of synthetically produced quartz glass.

As for the holding device, the above-mentioned object, starting from a holding device of the type set forth at the outset, is achieved in a first embodiment according to the invention in that the holding device comprises a fusion body of quartz glass which at the beginning of the first sintering phase rests on a support ring recessed in the area of the upper end of the SiO$_2$ body inner bore into the SiO$_2$ body wall, and which is fused in the course of the first sintering phase with the quartz glass of the SiO$_2$ body to be sintered and which at least during the second sintering phase is in operative interaction with the support ring which due to longitudinal shrinkage of the SiO$_2$ body is supported on a bearing arranged in the inner bore, and contributes together with said ring to a suspended holding of the SiO$_2$ body to be sintered.

In this modification of the known holding device according to the invention a fusion body of quartz glass is provided that is arranged in the inner bore of the SiO$_2$ body and that is fused in the first sintering phase into the upper end of the SiO$_2$ body to be sintered. After cooling and consolidation of the sintered upper SiO$_2$ body end, at least part of the fusion body is inseparably fused with the sintered quartz glass of the SiO$_2$ body and is also positively embedded thereinto as a rule. The fused (molten and/or embedded) fusion body serves the suspended holding of the SiO$_2$ body in the course of further the sintering process.

For this purpose a support ring is recessed in the area of the upper end of the inner bore of the SiO$_2$ body, the fusion body resting on said ring at the beginning of the first sintering phase. In the second sintering phase the support ring is supported due to longitudinal shrinkage of the SiO$_2$ body on a further holding element of the holding device, which is arranged in the inner bore, for instance on a gripper acting at the top or on the holding rod or on a cladding tube surrounding the holding rod, or it gets into direct or indirect operative interaction with a further holding element in the course of the sintering process, for example due to progressive longitudinal shrinkage during sintering of the SiO$_2$ body.

In this process the fusion body mechanically reinforces and fixes the support ring, as has been described in more detail above with reference to the method according to the invention.

Since the SiO$_2$ body is supported standing on the holding base in the first sintering phase, a mechanical positive connection between SiO$_2$ body and quartz glass component is not required yet in this procedural stage. The measures known from the prior art for fixing a holding member in an SiO$_2$ body prior to the beginning of the sintering process, e.g. by embedding or turning in, can thus be avoided and thereby also the accompanying drawbacks and risks.

The former fusion body, however, is firmly incorporated into the consolidated quartz glass mass after consolidation of the sintered upper end of the SiO$_2$ body and can therefore be used in the second sintering phase for a stable, operationally reliable suspended holding of the SiO$_2$ body section to be still sintered.

In a further embodiment of the device according to the invention it is intended according to the invention for the achievement of the above-indicated object, starting from a holding device of the type set forth at the outset, that the holding device comprise a ring-shaped fusion body of quartz glass which rests on the upper face of a cladding tube partly surrounding the holding rod and which in the course of the first sintering phase is fused with the quartz glass of the SiO$_2$ body to be sintered and which at least during the second sintering phase, while being in operative interaction with the cladding tube, contributes to a suspended holding of the $SiO_2$ body to be sintered.

In this embodiment of the holding device according to the invention a fusion body of quartz glass is also provided that is arranged in the inner bore of the $SiO_2$ body and that in the first sintering phase is fused into the upper end of the $SiO_2$ body to be sintered. After cooling and consolidation of the sintered upper $SiO_2$ body end the fusion body is inseparably molten at least in part with the sintered quartz glass of the $SiO_2$ body and is also positively embedded therein as a rule. The fused (molten and/or embedded) fusion body serves the suspended holding of the $SiO_2$ body in the course of the further sintering process.

For this purpose a cladding tube which partly surrounds the holding rod is provided, on the upper face of which the ring-shaped fusion body is positioned in the first sintering phase. During sintering a melt bond is formed between the quartz glass of the fusion body and the quartz glass of the soot body to be sintered.

In the second sintering phase the high-viscosity melt bond that has been produced in this way and consolidated is supported on the upper side of the cladding tube.

Since in the first sintering phase the $SiO_2$ body is supported standing on the holding base, a mechanical positive connection between $SiO_2$ body and quartz glass component is not needed yet in this procedural stage. The measures known from the prior art for fixing a holding member in an $SiO_2$ body before the beginning of the sintering process, e.g. by embedding or turning in, can therefore be avoided and thus also the accompanying drawbacks and risks.

The former fusion body, however, is firmly incorporated into the consolidated quartz glass mass after consolidation of the sintered upper end of the $SiO_2$ body and can therefore be used in the second sintering phase for a stable and operationally reliable suspended holding of the $SiO_2$ body section to be still sintered.

Further advantageous developments of the holding device according to the invention become apparent from the sub-claims. If developments of the holding device outlined in the sub-claims copy the procedures specified in sub-claims regarding the method according to the invention, reference shall be made for supplementary explanation to the above observations regarding corresponding method claims.

EMBODIMENT

Figure 2:
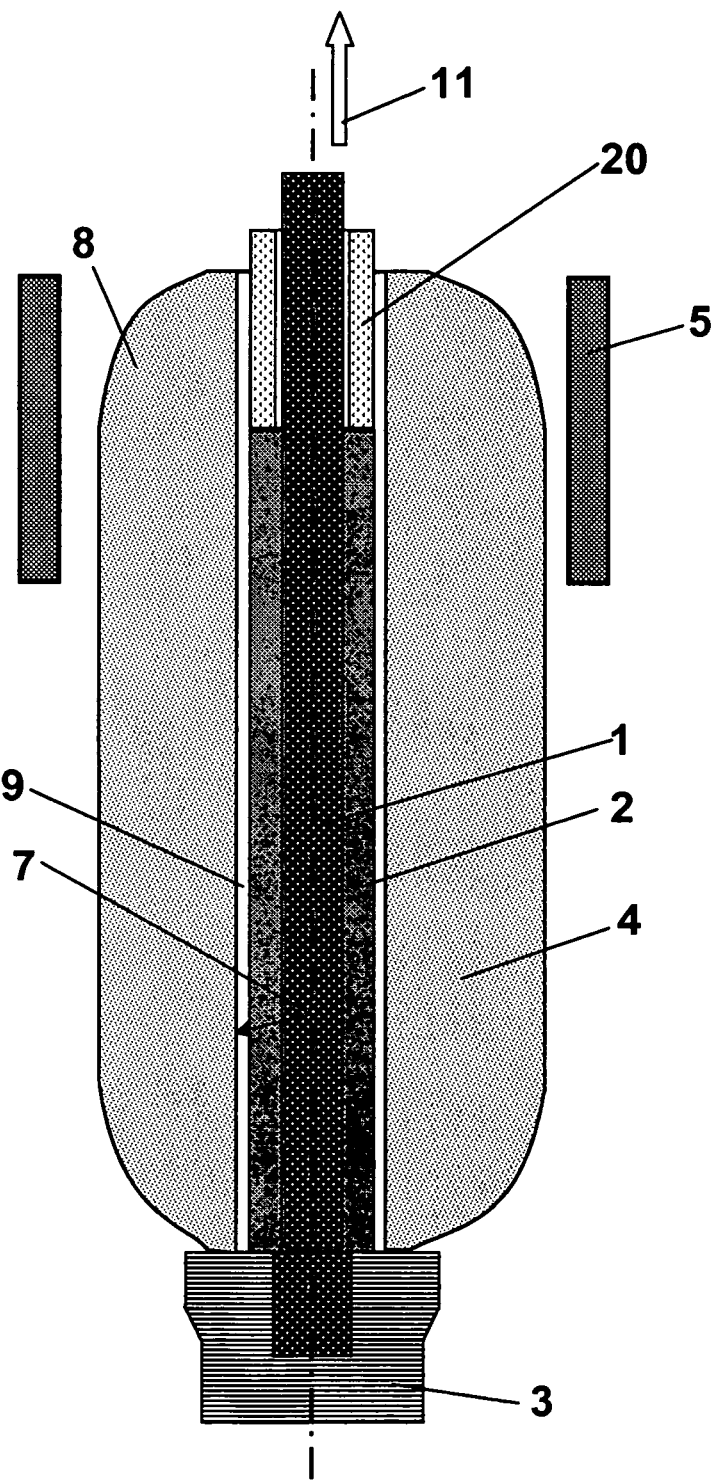
Figure 3:
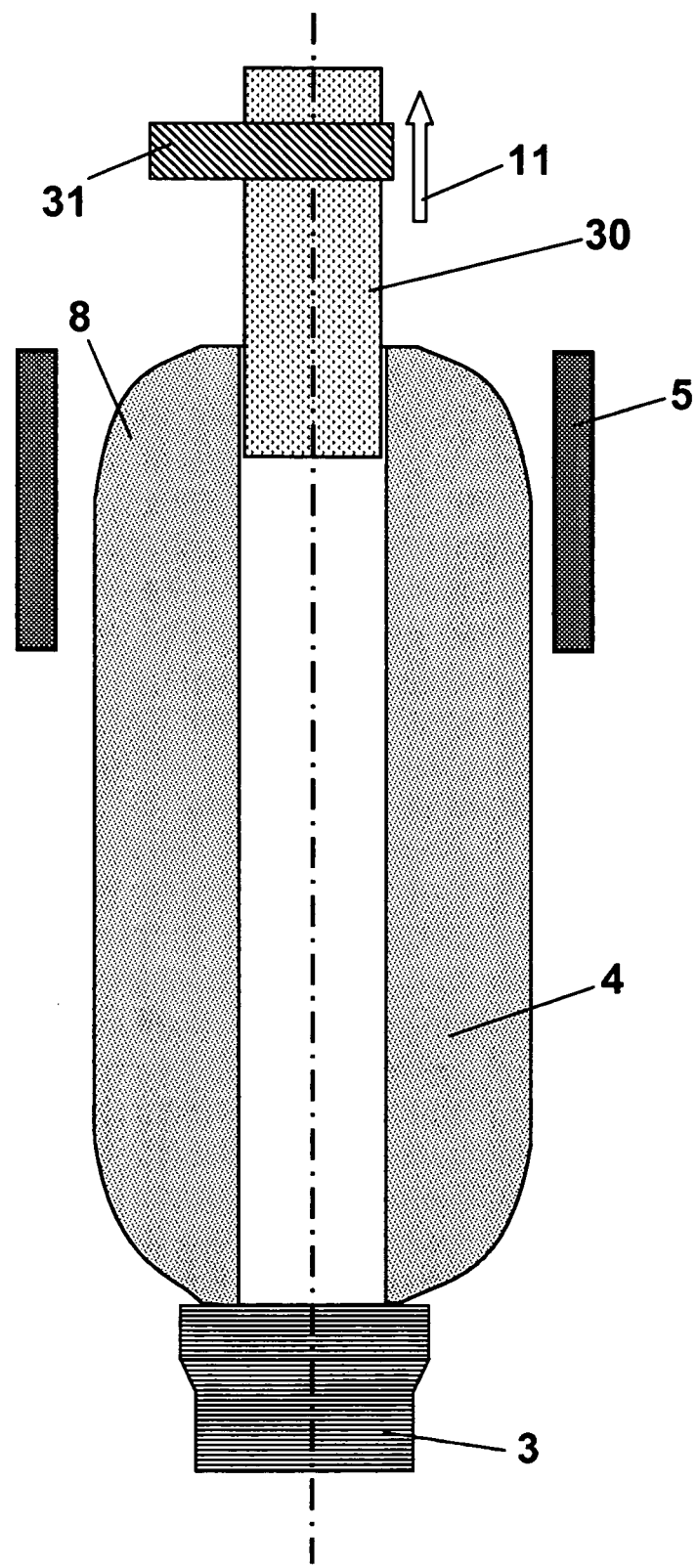

The invention will now be explained in more detail with reference to embodiments and a drawing which in a schematic illustration shows in FIG. 1 a first embodiment of the holding device according to the invention;

FIG. 2 a second embodiment of the holding device according to the invention; and FIG. 3 a third embodiment of a holding device for performing the method for sintering a soot body according to the invention.

The holding device according to FIG. 1 comprises a support rod 1 of CFC which is surrounded by a graphite tube 2 and connected to a holding base 3 of graphite.

The holding base 3 serves to accommodate $SiO_2$ soot tube 4 in a doping and vitrifying furnace comprising an annular heating element 5. The holding base 3 is provided with a horizontally oriented accommodating surface on which the soot tube 4 is standing in vertical orientation. Holding base 3 and support rod 1 are firmly interconnected by means of a thread.

The support rod 1 extends through the whole inner bore 7 of the soot tube 4. The part of the support rod 1 projecting beyond the upper end 8 of the soot tube 4 serves the handling of the assembly.

In the upper portion, a support ring 6 is inserted into the inner wall 7 of the soot tube 4. A ring 10 of synthetic quartz glass rests on the support ring 6.

Prior to sintering the soot tube 4 has a nominal inner diameter of 43 mm and a weight of about 200 kg. In the upper region the inner bore 7 is slightly expanded conically due to the manufacturing process. The support ring 6 has an outer diameter of 44 mm and is firmly fitted into the inner bore from above. The height of the quartz glass ring 10 is about 20 mm, its outer diameter is about 43 mm, and its inner diameter 32 mm. The outer diameter of the cladding tube 2 of graphite is 41 mm. Thus the width of the annular gap 9 between $SiO_2$ body 4 and cladding tube 2 is about 1 mm.

A method for producing a hollow cylinder of synthetic quartz glass by using the holding device shown in FIG. 1 will now be described in more detail.

$SiO_2$ soot particles are formed by flame hydrolysis of $SiCl_4$ in the burner flame of a deposition burner and said particles are deposited layer by layer on a support rod rotating about its longitudinal axis with formation of an $SiO_2$ body of porous $SiO_2$. After completion of the deposition process the support rod is removed. A transparent quartz glass tube is produced with the help of the method explained hereinafter by way of example from the resulting soot tube 4, which has a density about 27% the density of quartz glass.

After removal of the hydroxyl groups introduced due to the manufacturing process the soot tube 4 is inserted into a sintering furnace with a vertically oriented longitudinal axis and held therein by means of the holding device according to FIG. 1. The sintering furnace can be evacuated and is equipped with an annular heating element 5 of graphite.

Starting with its upper end, the soot tube 4 is drawn continuously from the bottom to the top through the heating element 5 at a feed rate of 5 mm/min and is heated and sintered zone by zone in this process, as indicated by directional arrow 11. The temperature of the heating element 5 is preset to 1600° C., whereby a maximum temperature of about 1580° C. is set on the surface of the soot tube 4. A melt front is here traveling inside the soot tube 4 from the outside to the inside and from the top to the bottom at the same time. The internal pressure prevailing inside the vitrifying furnace is kept by way of continuous evacuation at 0.1 mbar during vitrification. During sintering the soot tube 4 is shrinking zone by zone onto the cladding tube of graphite 2. In a first sintering phase the support ring 6 will move due to the longitudinal shrinkage of the soot tube 4 from the top to the bottom until it gets into contact with the upper side of the cladding tube 2. Together with the soot tube 4, the outer edge of the quartz glass ring 10 also starts to melt, whereby it establishes a melt connection with the inner wall of the soot tube 4. Moreover, the quartz glass mass is distributed in gaps between sintering soot tube 4 and support ring 5. After consolidation of the upper portion of the sintered soot tube 4 the quartz glass mass of the former quartz glass ring 10, which is distributed and consolidated in this way, stabilizes the graphite support ring 6 and its position, so that the suspended holding of the remaining soot tube 4 to be sintered, which begins in the second sintering phase, can be carried out in a reliable way. The quartz glass ring 10 is of the same quartz glass quality as the quartz glass of the finish-sintered soot tube 4, so that the viscosities of soot tube 4 and quartz glass ring 10 are the same at the sintering temperature.

The sintered hollow cylinder is of high purity and shows a low hydroxyl group concentration, which permits an application in the near-core region of a preform for optical fibers, for instance as a substrate tube for inside deposition by means of MCVD methods. The quartz glass tube is of course also suited for overcladding a core rod during fiber drawing or for manufacturing a preform or for use in the manufacture of a lens blank for microlithography.

FIG. 2 shows a variant of the holding device according to the invention. In comparison with the embodiment shown in FIG. 1, the support ring 6 and the quartz glass ring 10 are replaced by a quartz glass sleeve 20. The quartz glass sleeve 20 has an inner diameter of 32 mm, an outer diameter of 41 mm, which corresponds to the outer diameter of the cladding tube 2 of graphite, and a height of 300 mm.

At the beginning of the first sintering phase the quartz glass sleeve 20 is standing on the upper face of the cladding tube 2 of graphite. In the first sintering phase the quartz glass sleeve 20 is fused with the inner wall of the upper end of the soot tube and forms a constriction of the inner bore 7 after consolidation of the quartz glass mass. After consolidation this constriction is supported on the upper face of the cladding tube 2, so that the further longitudinal shrinkage of the soot tube 4 leads to a gradual lifting from the support base 3 and to a suspended holding of the soot tube.

The quartz glass sleeve 20 substantially fills the annular gap between holding rod 1 and inner wall of the soot tube. A remaining annular gap with a width of 1 mm remains relative to the holding rod 1, so that the quartz glass sleeve 20 protects the holding rod 1 above the cladding tube 2 of graphite against mechanical impact and damage and against an oxidative environment.

In the embodiment of the holding device as shown in FIG. 3, a vitrifying rod system of graphite is substantially dispensed with. There is just provided a holding base 3 of graphite on which the soot tube 4 rests at the beginning of the sintering phase and during the first sintering phase. A quartz glass tube 30 extends into the upper region of the inner bore 7 of the soot tube and projects upwards to some extent and is engaged by a gripper 31. The quartz glass tube 30 has an inner diameter of 32 mm, an outer diameter of 43 mm, and a length of 500 mm.

The quartz glass tube 30 consists of synthetic quartz glass which in comparison with the quartz glass of the finish-sintered soot tube 4 shows a lower hydroxyl group content and thus a higher viscosity. At the beginning of the sintering process it is held by means of the gripper 31 in the inner bore 7. During the first sintering phase the soot tube 4 is standing on the holding base 3 and the quartz glass 30 is fused with the inner wall of the upper end of the soot tube 4. After consolidation the quartz glass tube 30 forms a firm melt connection with the sintered upper part of the soot tube 4, so that the further holding thereof in the second sintering phase can be carried out by means of quartz glass tube 30 and gripper 31.

Special advantages of this procedure are that foreign matter, such as graphite, can be substantially dispensed with in the inner bore 7 of the soot tube 4, and that a complete collapsing of the inner bore 7 is also made possible during sintering of the soot tube 4, if desired.

The invention claimed is:

1. A method for producing a quartz glass cylinder, the method comprising:
   providing a porous $SiO_2$ body having a $SiO_2$ body wall defining a central inner bore with a lower end and an upper end;
   sintering the $SiO_2$ body in a sintering furnace zone by zone, starting from the upper end so as to obtain the quartz glass cylinder;
   holding the $SiO_2$ body with a holding device so that the $SiO_2$ body is held standing in vertical orientation during a first sintering phase and is suspended in a second sintering phase;
   wherein the holding device comprises a fusion body of quartz glass that, at the beginning of the first sintering phase, is positioned on a support ring that is supported on the $SiO_2$ body wall below the upper end of the inner bore, and
   wherein said fusion body during the first sintering phase fuses with quartz glass of the $SiO_2$ body and during the second sintering phase is in operative interaction with a holding element of the holding device and together with said holding element contributes to holding the $SiO_2$ body suspended during the second sintering phase.

2. The method according to claim 1, wherein the support ring is recessed into the inner bore and the support ring is supported by longitudinal shrinkage of the $SiO_2$ body in the second sintering phase on a bearing arranged in the inner bore.

3. The method according to claim 2, wherein the fusion body is rin shaped.

4. The method according to claim 1, wherein the fusion body is of a quartz glass that at a sintering temperature thereof has a higher viscosity than the quartz glass of the $SiO_2$ body.

5. The method according to claim 1, wherein the fusion body is of synthetically manufactured quartz glass.

* * * * *